Feb. 5, 1963 O. SUTER ETAL 3,076,966
RATE OF PENETRATION AND WEIGHT RECORDER
Filed Oct. 7, 1957 5 Sheets-Sheet 1

INVENTORS
OSWALD SUTER
BY JOSEPH H. DeLACY
Fulwider Mattingly & Huntley
Attorneys

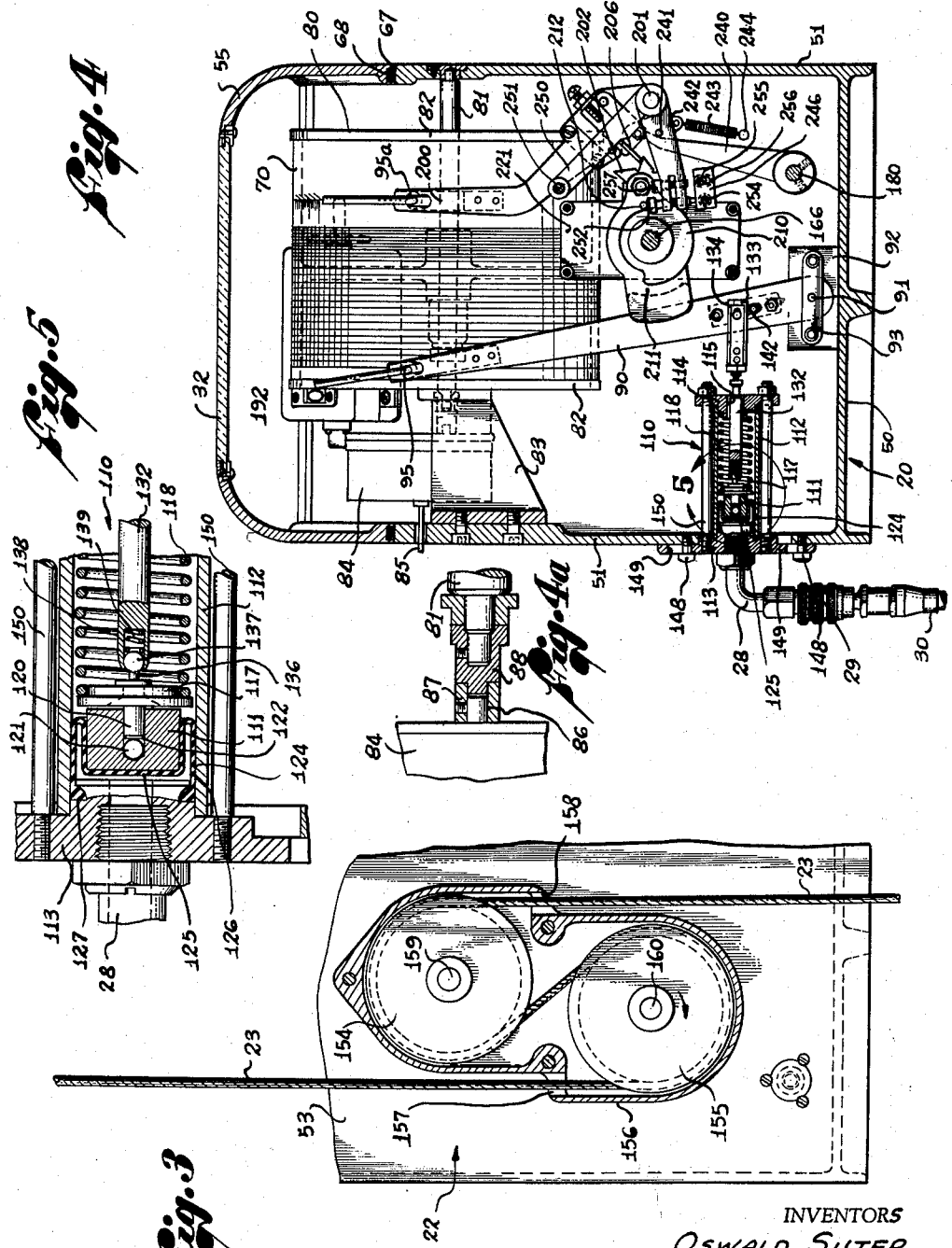

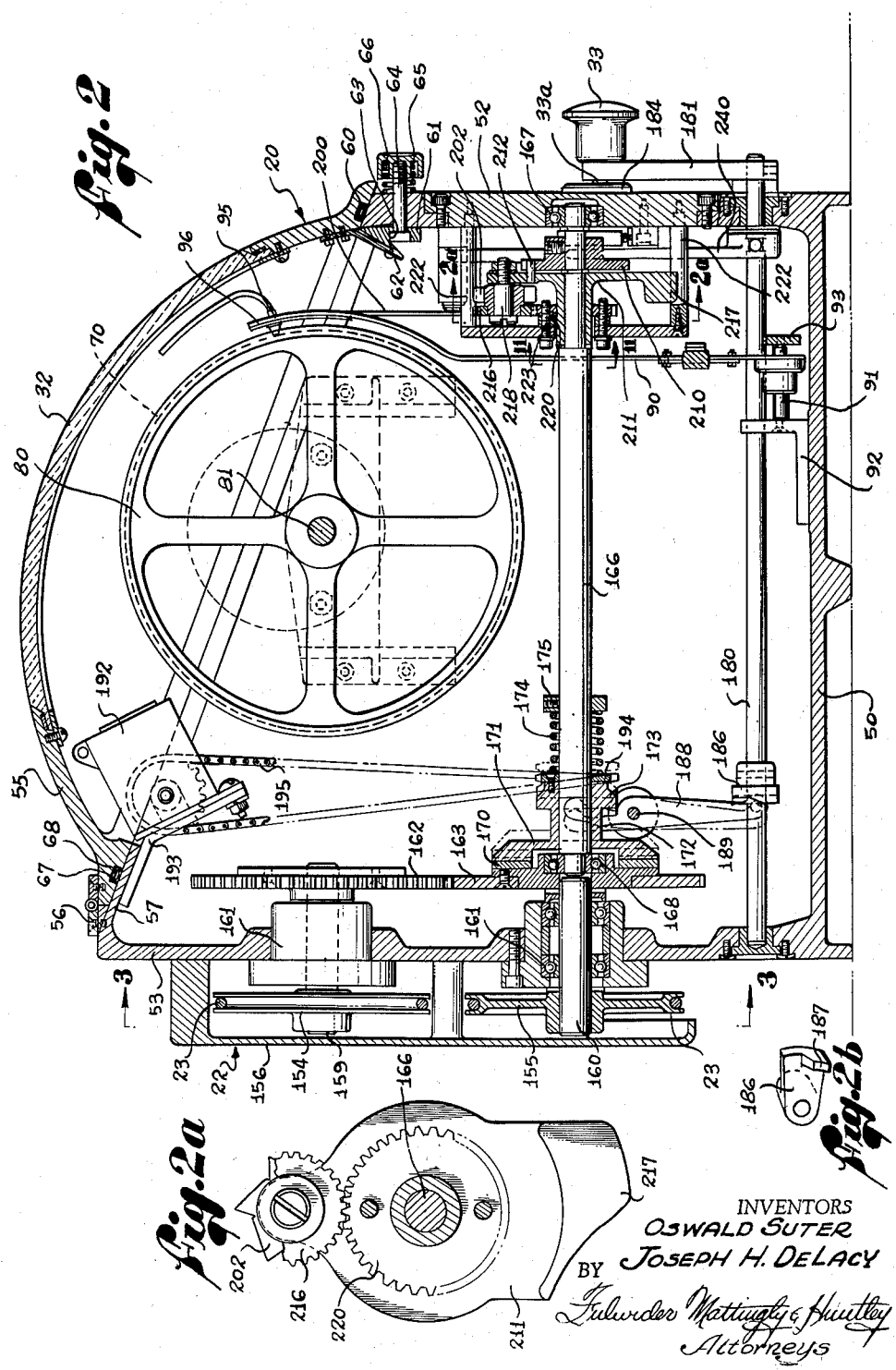

Feb. 5, 1963     O. SUTER ETAL     3,076,966
RATE OF PENETRATION AND WEIGHT RECORDER
Filed Oct. 7, 1957     5 Sheets-Sheet 4
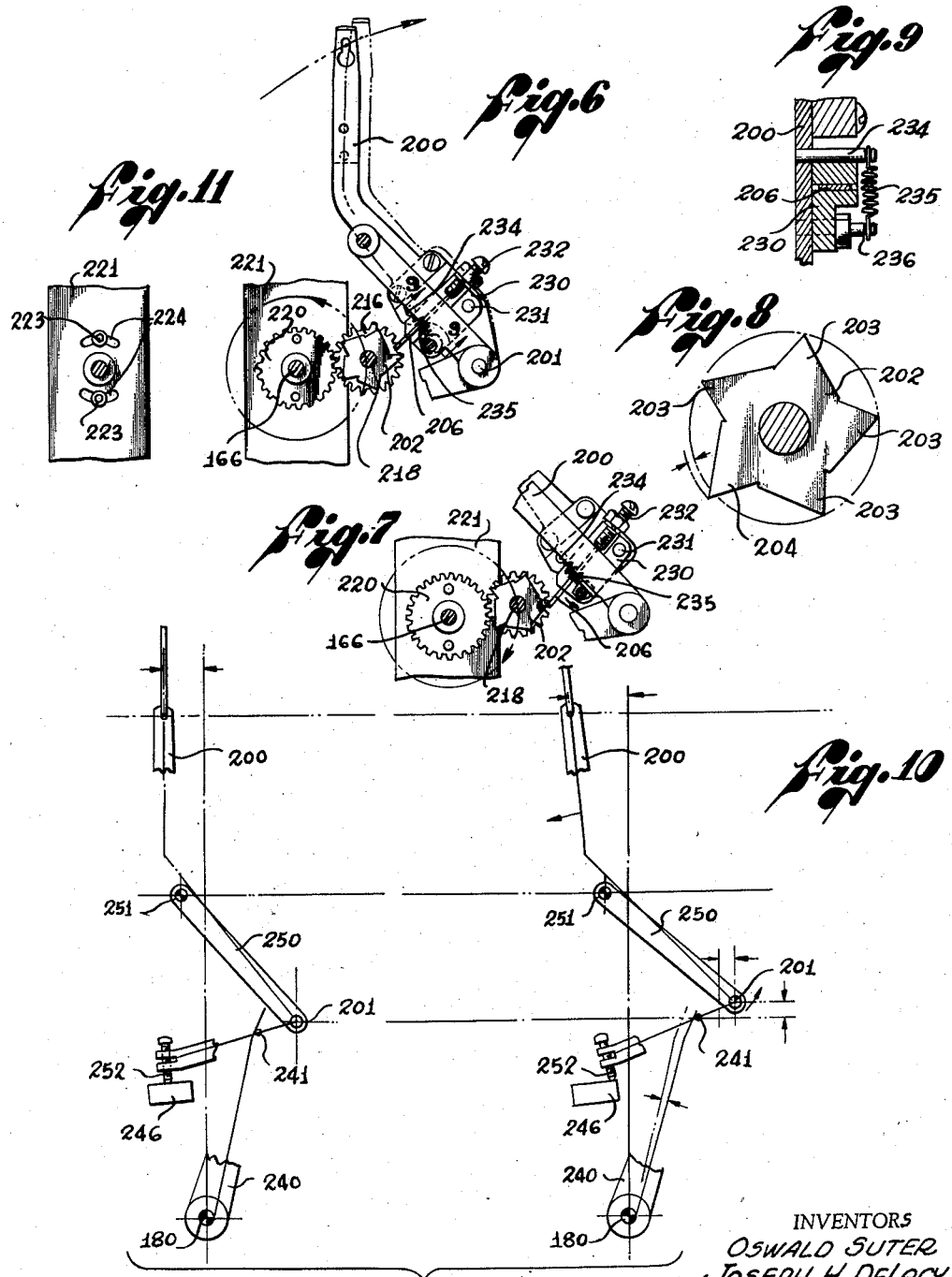
INVENTORS
OSWALD SUTER
JOSEPH H. DELACY
BY
Attorneys Feb. 5, 1963   O. SUTER ETAL   3,076,966
RATE OF PENETRATION AND WEIGHT RECORDER
Filed Oct. 7, 1957   5 Sheets-Sheet 5
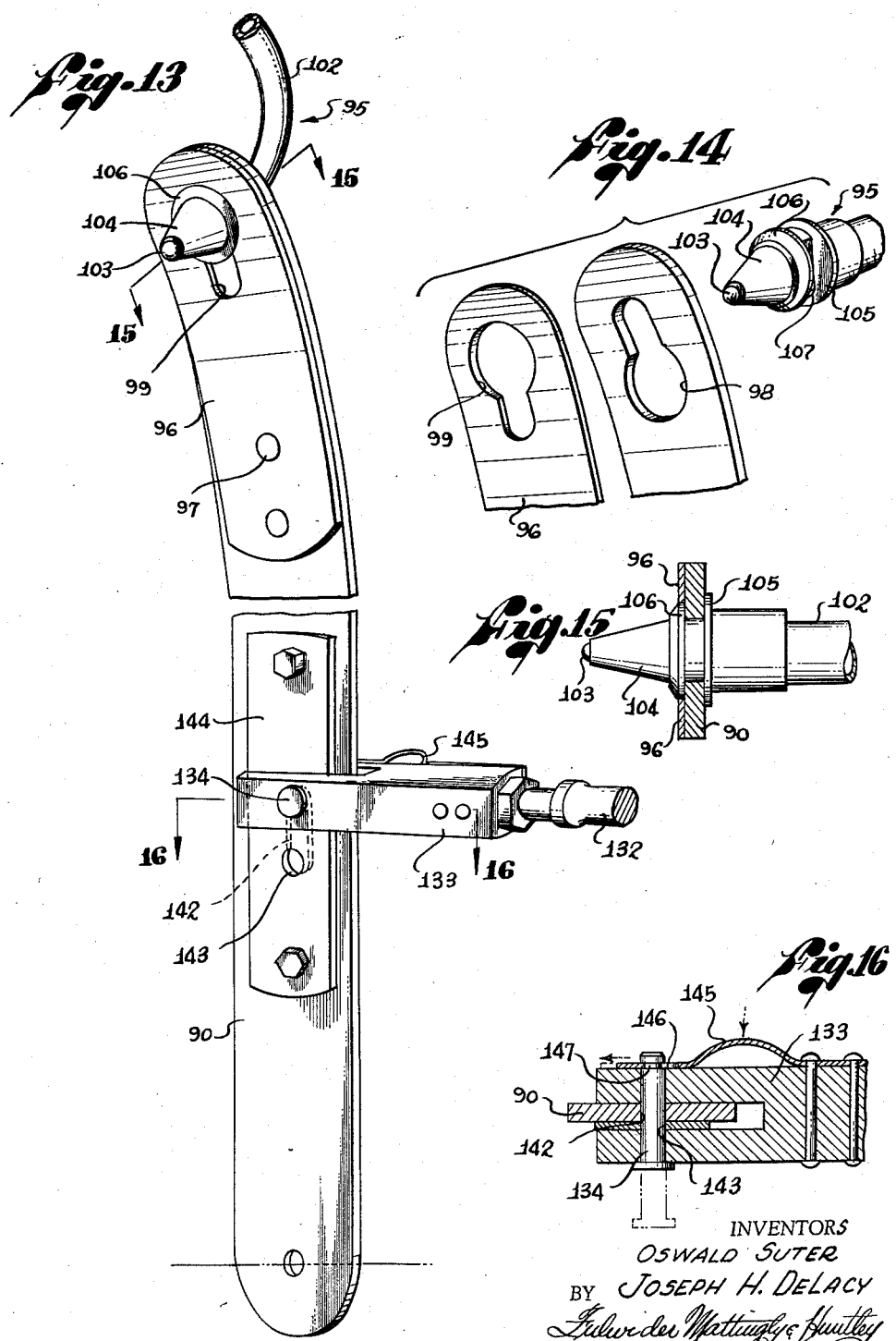
INVENTORS
OSWALD SUTER
BY JOSEPH H. DeLACY
Attorneys United States Patent Office 3,076,966
Patented Feb. 5, 1963

3,076,966
RATE OF PENETRATION AND WEIGHT RECORDER
Oswald Suter and Joseph H. De Lacy, Los Angeles, Calif., assignors to Technical Oil Tool Corporation, Ltd., Los Angeles, Calif., a corporation of California
Filed Oct. 7, 1957, Ser. No. 688,643
14 Claims. (Cl. 346—33)

This invention relates generally to a device for recording the rate of penetration of a well drill and simultaneously recording the weight carried on the drill string. By a proper study and correlation of these two factors, much valuable information can be obtained concerning the character of the earth formation being drilled. More specifically the invention relates to a recording device of this kind which is unusually accurate, durable, and produces a chart that is direct reading and contains positive and no-confusing indicia thereon.

For recording the rate of penetration of the drill, a measuring line or cable is directly connected between linear measuring means in the recorder and the traveling block of the derrick. For recording the weight on the drill string a fluid pressure transmitting device is connected directly to the hoisting cable of the draw works, and coupled to a pressure responsive means in the recorder. The measuring means and the pressure responsive means in the recorder are each linked with a stylus that traces upon a single time advanced chart to thus produce simultaneous records which can be directly correlated.

A most important consideration in a device of this kind is the accuracy of the recorded information and this requires that the device be made directly responsive to the drill condition and postively driven to avoid coupling errors, transmission lags, and the like. At the same time, care must be taken to avoid false readings due to drill vibration and bounce, mechanical friction losses and other introduced errors.

With the foregoing in mind it is a major object of the invention to provide a rate of penetration and weight recorder which produces a simultaneous time based record of both of these conditions and provides a high degree of accuracy.

An equally important object of the invention is to provide a rate of penetration recorder which produces a single trace record of actual linear advance of the drill pipe, indicates the commencement and ending of non drilling activities, and is inactive during interim movement.

It is also an object of the invention to provide a drilling weight recorder which is positively driven by fluid connection and transmits pressure units into substantially linear movement of a recording stylus without friction losses.

A further object of the invention is to provide rate of penetrating recording means which produces indicia showing units of linear advance, separate indicia for group of units, and indicia showing disconnection of the recording means from the measuring means.

Another object of the invention is to provide penetration recording means having a lost motion connection to avoid false readings due to drill bounce, and means preventing the recording of reverse drill movement.

It is still another object of the invention to provide a device of the character described which is of durable construction and is simple and foolproof in operation.

These and other objects and advantages of the invention will become apparent from the following detailed description of a prefered embodiment thereof, and from an inspection of the accompanying drawings in which:

FIG. 2 is a longitudinal medial section though the recorder taken in the direction 2—2 of FIG. 1;

FIG. 2a is a sectional detail taken along the line 2a—2a of FIG. 2;

FIG. 2b is a detail of the declutching cam;

FIG. 3 is a sectional detail of the measuring wheel means taken along the line 3—3 of FIG. 2;

FIG. 4 is a front cross section showing the front interior of the recorder;

FIG. 4a is a detail showing the chart drum drive connection;

FIG. 5 is a sectional detail taken in the area 5 of FIG. 4;

FIGS. 6 and 7 are details showing the operation of the rate of penetration stylus means and the actuating member;

FIG. 8 is a detail showing the actuating star wheel;

FIG. 9 is a sectional detail along the line 9—9 of FIG. 6;

FIG. 10 is a schematic view illustrating the operation of the straight line follower mechanism;

FIG. 11 is a sectional detail along the line 11—11 of FIG. 2;

FIG. 13 is a partial perspective view of the stylus arm and holder construction;

FIG. 14 is an exploded detail of the stylus and locking holder connection;

FIG. 15 is a sectional view taken along the line 15—15 of FIG. 13; and

FIG. 16 is a sectional detail of the linkage connection taken along the line 16—16 of FIG. 13.

Figure 1:
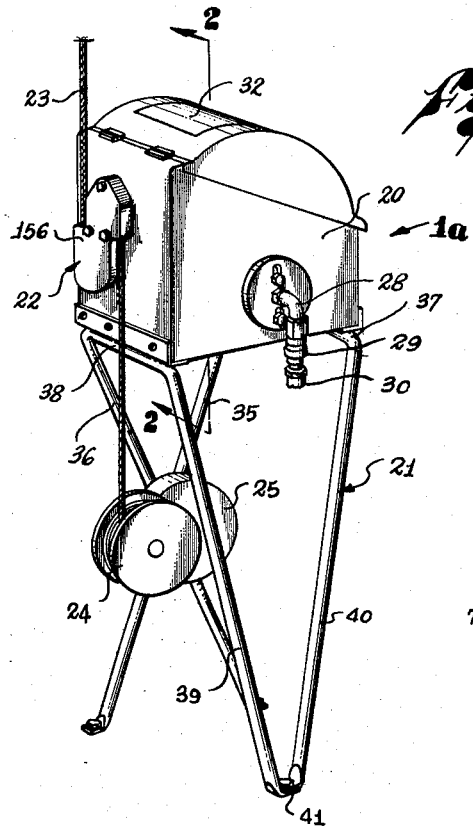
FIG. 1 is a perspective view of the complete recorder.
Figure 1A:
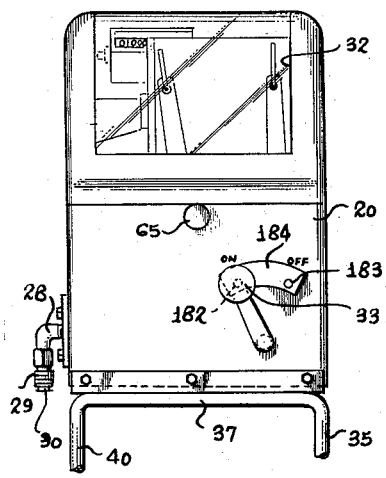
FIG. 1a is a front elevation taken in the direction of the arrow 1a of FIG. 1.

Referring now to the drawings, the recorder is best seen externally in FIGS. 1 and 1a. As is illustrated, the recorder has a box-like case or housing 20 which is supported on a tubular stand 21 that is suitably secured to the floor of the drilling rig in a position accessible to the driller. On the back of housing 20 is a measuring wheel means 22 that engages with a measuring line or cable 23. The upper end of line 23 leads upwardly through the derrick and is connected to the traveling block of the drill support so that it is directly responsive to vertical movement of the drill string. The lower end of line 23 passes over a pulley 24 and thence into a take-up reel 25 mounted on stand 21. Take-up reel 25 is of conventional spring wound design, and serves to maintain tension on line 23 at all times as it is payed in or out in accordance with the movement of the drill string.

On the side of housing 20 is a fluid connecting unit including a fitting 28 leading internally into the recorder, and a self-closing connector 29 which is mounted on the end of a fluid hose or conduit 30. The latter leads to the recorder from a pressure transmitting source (not shown) which is connected to the hoisting cable of the draw works. This device measures the tension in the hoisting cable and typically develops a load against a diaphragm to create hydrostatic pressure on the fluid in conduit 30. Corrected for the mechanical advantage of the traveling and crown blocks, this hydrostatic pressure gives a direct reading of the weight on the drill pipe.

Considering the front of the recorder, a large window 32 is provided in the upper portion to permit observation of recording chart means mounted therein. Below window 32 is an operating handle 33 movable between off and on positions by the driller. This single control handle 33 serves to disconnect the measuring wheel means 22 from the internal recording mechanism, as will hereinafter be described in more detail, and its function is to limit the recording of footage to actual drill advance or penetration. Thus, in operation handle 33 is kept in an off position during all trips in and out of the hole, make up operation, and the like. When the drill is on bottom and drilling is actually occurring, the handle 33 is moved to the on position so as to record the footage traveled.

Before considering the interior of the recorder, it is noteworthy to point out that stand 21 is of unusual construction and is particularly adapted to the installation of the recorder on a drilling rig. Stand 21 provides a tripod support so that the recorder is always solidly connected to the rig floor regardless of the unevenness thereof. At the same time it provides good lateral stability and the simplicity of unitary tubular construction. Viewed from one side, stand 21 has a pair of cross legs 35 and 36 which extend vertically and join with front and rear support rails 37 and 38, respectively. At the other end of rails 37 and 38, a pair of legs 39 and 40 extend vertically in a V shape to join together in a common foot 41. Traced from one end it will be seen that this construction may be formed of one continuous length of tubing merely by bending operations to provide a very rigid and sturdy support.

The layout and internal operating mechanism of the recorder is best seen generally in FIGS. 2 and 4. Case or housing 20 is a heavy rectangular casting including a base or bottom 50, side walls 51, a short front wall 52, and a somewhat higher rear wall 53. All of the walls are joined integrally with each other to form a weather tight enclosure of durable construction, which is completed by a hinged upper cover 55 that carries window 32. Cover 55 is of domed shape as viewed in longitudinal section, and is tilted downwardly from back to front when closed, so that observation through window 32 can be had from a front as well as an upward position. Hinges 56 connect cover 55 to a forwardly extending flange 57 formed on rear wall 53 so that the cover may open upwardly for access into the housing.

To hold cover 55 in place a latch 60 is mounted on the front edge thereof and engages with a keeper plate 61 mounted at the top of front wall 52. Latch 60 is formed of resilient material and includes a lower hook end 62 adapted to override and engage with a recessed surface 63 formed on keeper plate 61 so as to provide for self-latching upon closure. In order to release latch 60 a plunger 64 is mounted for sliding movement through wall 52 and plate 61 in a position to engage with hook end 62. The outer end of plunger 64 carries a release button 65 which is urged outwardly by a spring 66. As button 65 is depressed, hook end 62 is disengaged from surface 63 and permits cover 55 to be raised.

To complete the weather proofing of the enclosure, a resilient O ring 67 extends around the lower rim of cover 55 in a groove 68 and is adapted to deformably engage with the top edge of the housing walls upon closing of the cover. Window 32 conforms to the domed shape of cover 55 and is gasketed tightly therein, so that the working parts of the device are thus fully protected from the mud, grease and other contaminants found on the drilling rig.

Figure 12:
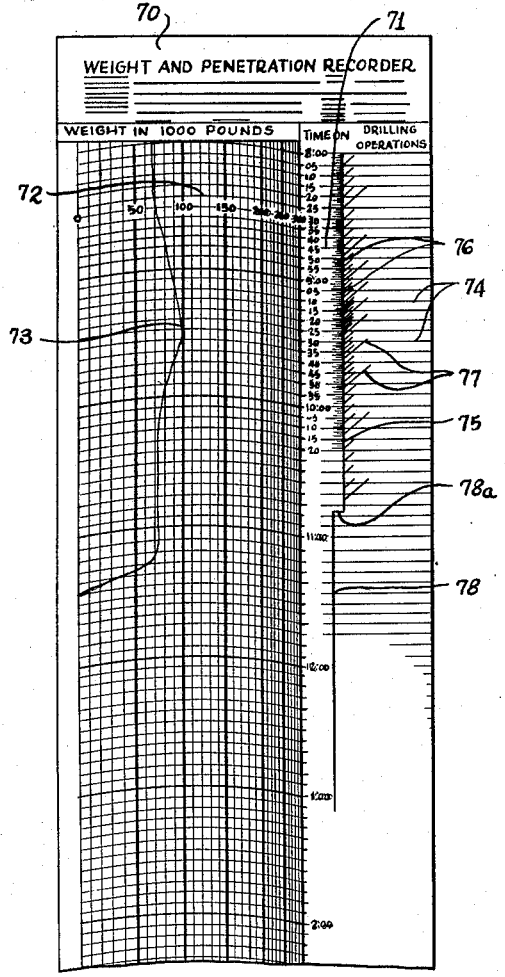
FIG. 12 is front view illustrating the recording chart.

The chart and advancing means are mounted centrally within housing 20, and since they function cooperatively with both the rate of penetration and weight recording means are best described first. A single chart 70 as is seen in FIG. 12, is used to record both the drilling weight and the rate of penetration. This chart 70 is preferably an elongated strip of paper marked off longitudinally in uniform increments of time as by a central scale 71. The chart is moved longitudinally in accordance with these increments of time as will be described. The length of the chart may conveniently indicate a 12 hour period of operation, and thus two charts are used daily to record all of the drilling operations. Across the left hand side of chart 70 is a scale 72 indicating the drilling weight in thousands of pounds and having longitudinally extending ruled lines indicating units of the weight scale. A typical trace line 73 indicating a record of drilling weight is illustrated on chart 70 and will hereinafter be described in more detail.

Along the right hand side of chart 70 is a space for recording the rate of penetration of the drill simultaneously with the weight recording. Transverse ruled lines 74 corresponding to units of time may extend across this space, and a typical trace record of penetration extends longitudinally along the space. This record trace consists of a base line 75 which extends longitudinally and moves laterally to the right at spaced points to provide marks 76 showing each foot of penetration. Somewhat longer marks 77 indicate each five feet of penetration, and as can be understood the spacing of these marks varies in accordance with the rate of penetration. This record trace also indicates whether actual drilling or other operations are occurring, and to this end the base line 75 is shifted to the left as at 78 whenever the operating handle 33 is moved to the off position. During the time the base line is shifted to the left, no footage marks 76 or 77 are recorded since such marks would not give a true record of footage drilled.

Chart 70 is removably supported on a large chart drum 80 which is fixed for rotation on a transverse shaft 81 extending horizontally across the recorder housing. The circumferential length of drum 80 is such as to receive chart 70 thereon without the ends overlapping, and the chart may be conveniently held in place by side flanges 82 formed on the edges of the drum. As is best seen in FIG. 4, the shaft 81 has its right hand end journaled in right side wall 51 and extends across the recorder but terminates somewhat short of the left side. A bracket 83 is secured to the left recorder wall 51 and extends inwardly to support the left end of shaft 81 and a time controlled advancing means 84. The latter comprises a conventional spring wound clockwork having a winding stem 85 extending through the side of the recorder, and a drive shaft 86 extending inwardly in alignment with shaft 81, best shown in FIG. 4a.

Shaft 86 is coupled to drum shaft 81 by rotationally adjustable driving dogs 87 and 88 as are seen in FIG. 4a. The direction of rotation of clockwork 84 is such as to cause drum 80 to move upwardly as viewed from the front, so that chart 70 is advanced uniformly along the time scale 71.

In order to record the drilling weight on chart 70 a stylus means is mounted in front of drum 80 in general alignment with the left hand portion of the chart. This stylus means includes an elongated stylus arm 90 which is pivotally mounted at the bottom of the recorder housing and has a free swinging upper end which is adapted to move back and forth across the face of chart 70. The pivot support for arm 90 as is best seen in FIG. 2, has a pivot shaft 91 journaled by a rear fixed bracket 92 mounted on housing bottom 50 and a front plate 93 which is mounted in forwardly spaced relationship to the bracket and may be removably connected thereto. As is also seen in FIG. 2, arm 90 extends vertically upwardly and has a forwardly bent arcuate upper portion which lies close to the peripheral surface of drum 80. Arm 90 is preferably formed of resilient material and is prestressed so that it tends to bear rearwardly against drum 80 and chart 70.

The top end of arm 90 carries a removable stylus 95 which rides on chart 70 to trace the weight record. Stylus 95 is held in place by quick release means which are best described with reference to FIGS. 13 through 15. Mounted on the face of arm 90 adjacent to chart 70 is a short spring holder plate 96 which has its bottom end secured to the arm as by rivets 97 and extends upwardly in abutting relationship to the arm. Arm 90 has an inverted keyhole slot 98 therein, and plate 96 has an upright keyhole slot 99 therein in register with the first slot. That is, the enlarged circular portion of slot 98 is at the top with the reduced rectangular portion at the bottom, and slot 99 is vice versa.

Stylus 95 is typically formed as a ball point writing unit having an outer tubular ink supply 102 and an inner writing ball 103 mounted in a nose cone 104. Between cone 104 and ink tube 102 is a head formed with an outer enlarged collar 105, an inner somewhat smaller collar 106, and an intermediate neck portion 107 having parallel vertical sides which will fit non-rotatably in the rectangular portion of the keyhole slot 98 and is of the same length as the thickness of arm 90. The smaller collar 106 is of a size which just fits through the circular portions of slots 98 and 99, and collar 105 will not pass through either of the slots.

To mount stylus 95 in place, nose cone 104 and collar 106 are passed through the circular portion of slot 98. Nose cone 104 passes through the rectangular portion of slot 99 but collar 106 will not pass therethrough so it resiliently forces plate 96 away from arm 90. When collar 105 comes into abutment with the surface of arm 90, neck portion 107 is in alignment with the rectangular portion of slot 98 and may be moved upwardly therein. As this occurs, collar 106 comes into alignment with the circular portion of slot 99 and plate 96 springs back into abutting relationship with arm 90. The stylus 95 is then held rigidly in place and cannot move in any direction.

Pivotal movement of arm 90 in accordance with the drilling weight is caused by a pressure actuated unit 110 which is mounted near the bottom of the recorder housing on the left hand wall 51 as seen in FIG. 4. As will be remembered a fluid fitting 28 connected to a fluid hose 30 is mounted on the side of the recorder for external connection to a pressure transmitting source, and the fluid therein communicates into actuator unit 110. At this point, the fluid pressure is transformed into linear movement of a piston-like follower 111 which is mounted for horizontal reciprocation within a cylinder 112.

As is best seen in FIGS. 4 and 5, cylinder 112 has its outer end closed by an end cover 113 which is secured to recorder wall 51, and an inner end wall 114 which is substantially closed except for a central aperture 115. Follower 111 consists of a cylindrical plug or block fitting in spaced relationship to the wall of cylinder 112 and rotatably carries on its inner end a flanged disc 117 which engages against one end of a balance spring 118. The other end of spring 118 engages against end wall 114 and thus tends to drive follower 111 to the left as viewed in FIGS. 4 and 5.

In order that follower 111 may cant slightly relative to spring disc 117 and be rotatable relative thereto, a follower pin 120 having a rounded head is seated rockably within a socket formed in the disc. The other end of pin 120 rides on a ball 121 seated within a central bore 122 of the follower and holds disc 117 slightly spaced from the end of the follower.

Spring 118 is designed to have a uniform linear rate and balances fluid pressure exerted against the opposite end of follower 111. Thus the amount of linear movement of the follower 111 will represent units of pressure if friction losses are disregarded. While follower 111 might be mounted in cylinder 112 to function as a piston opposed by fluid pressure, it has been found that such an arrangement has so much friction as to destroy the accuracy of the record. Therefore, follower 111 is indirectly exposed to fluid pressure by means of an intermediate diaphragm means 124 which is fitted within cylinder 112 in such a manner as to avoid sliding friction.

As is best seen in FIG. 5 the diaphragm means 124 takes the form of a flexible resilient bellows having a central cup portion 125 surrounding the outer end of follower 111 and thence turned outwardly and back upon itself to form an outer peripheral wall portion 126 which fits closely with the wall of cylinder 112 and extends therealong to a terminal securing lip 127. The central portion of cover 113 extends within cylinder 112 to form a boss 128 having the inner end thereof flanged outwardly to grip securing lip 127 and thus holds the bellows tightly in place.

As fluid pressure is transmitted through fitting 28 and plug 128 it enters bellows 124 and acts against the bottom of cup portion 125 tending to move follower 111 to the right and distort the side wall of the cup so that more of it is folded back along the outer wall portion 126. The only frictional resistance to this movement is the internal resistance of the bellows 124 to deformation, and since this can be made very slight, the follower 111 moves uniformly without any appreciable frictional resistance.

Follower 111 is connected to the stylus arm 90 by a linkage which comprises a plunger 132 connected to follower disc 117 and extending out through end aperture 115. The opposite end of plunger 132 is adjustably connected to a clevis 133 which is pivotally connected to arm 90 by a pin 134. It will be appreciated, that follower 111 must be constrained to linear movement in order to avoid lateral friction on bellows 124, and that the movement of clevis 133 and connecting pin 134 traces an arc about the stylus arm pivot shaft 91. In order to accommodate these two motions, a universal joint connection between follower disc 117 and plunger 132 is employed. This connection takes the form of a connecting pin 136 secured to disc 117 and having a spherical balled end 137 mounted within a plunger socket 138. The end of plunger 132 is formed inwardly to hold ball 137 in place, and a spring 139 holds the ball outwardly and resiliently in place.

As will be remembered, the fluid pressure within line 30 gives a direct reading of the drilling weight when a proper connection for the mechanical advantage of the hoisting equipment is made. There are currently two popular mechanical advantage systems in use in the drilling industry, and in order that the recorder may be used to give direct weight readings with either of these systems or those which may subsequently be employed, provision is made for adjustment of the position of actuating linkage relative to the stylus arm 90. This requires vertically shifting the position of clevis 133 relative to arm 90 and consequently necessitates a vertical shift in the position of the pressure actuating unit 110.

Clevis 133 is moved relative to arm 90 by shifting the position of pin 134 along an elongated slot 142 formed in the arm. The clevis 133 is then held in the desired position by means of adjusting holes 143 formed in a back plate 144 secured on arm 90 as is best seen in the details of FIGS. 13 and 16. In order that this adjustment may be easily made a quick connection employing a spring latch plate 145 is used to hold pin 134 in place. Latch plate 145 is mounted on the front of clevis 133 and has a bowed central depressible portion and a free end portion which overlies the pin receiving holes in the clevis. An elongated slot 146 is formed in plate 145 having an enlarged opening towards the fixed end and a reduced opening at the opposite end which engages tightly with a pin groove 147. To place pin 134 in position, the bowed portion of plate 145 is depressed so that the pin may pass through the enlarged end of slot 146. As plate 145 is released it moves the slot 146 back to its normal position and engages with groove 147.

Vertical adjustment of pressure unit 110 is accomplished by moving end cover plate 113 relative to recorder wall 51 through adjustment of holding screws 148 relative to elongated upper and lower slots 149 formed in the cover. It will be noted that unit 110 is formed as a unitary structure with cylinder 112 and inner end wall 114 secured to the outer end cover by means of a plurality of external elongated studs 150. Thus adjustment of outer cover plate 113 properly positions the entire assembly.

In operation, the fluid pressure entering unit 110 is proportional to the drilling weight. The consequent movement of follower 111 and the stylus arm 90 across the face of chart 70 thus gives a direct indication of the weight. Since chart 70 is constantly moving at a time controlled rate, the stylus 95 traces a continuous record of the drilling weight on the chart, such a typical trace having previously been indicated as the trace 73.

Simultaneously with the weight recording, a record of the rate of penetration is being made as will now be described in detail. It will be remembered that the measuring wheel means 22 is moved in response to the linear movement of the drill string by the measuring line 23. In order to have a sufficient area of contact between the measuring wheel and the line so as to avoid slippage, it has been the practice to wrap the measuring line around the measuring wheel in at least a complete turn of 360° and sometimes several turns. The result is that the measuring line overlaps upon itself and there is constant rubbing friction between the different sections of the line.

The preferred form of measuring wheel means 22 used herein avoids the problem of line friction and at the same time provides a total peripheral area of line contact in excess of the equivalent of 360° of the measuring wheel circumference, by the use of a pair of coupled upper and lower measuring wheels 154 and 155, respectively, as are best seen in FIGS. 2 and 3. These wheels 154 and 155 are mounted on the back of housing wall 53 in vertically spaced relationship and may be enclosed within a protective cover 156. At the left hand side of cover 156 (FIG. 3) is a central upwardly faced opening 157 and on the opposite side is a downwardly faced central opening 158.

The upper portion of line 23 leads downwardly through opening 157 and is wrapped around the lower periphery of measuring wheel 155. Line 23 is then crossed over to the other side, is wrapped around the upper peripheral portion of wheel 154, and passes out of cover 156 through opening 158. It will be seen that line 23 thus engages with more than half the peripheral extent of each wheel 154 and 155 to provide a total peripheral extent of contact considerably in excess of the equivalent of 360° of the measuring wheel circumference. At the same time line 23 is never crossed back upon itself at any point.

Wheels 154 and 155 are mounted for rotation with short stub shafts 159 and 160, respectively, which are suitably journaled in bearings 161 mounted in wall 53. Affixed to the rear ends of shafts 159 and 160 are meshed gears 162 and 163, respectively, so that the measuring wheels are thus locked for rotation together and no relative slippage can occur. The circumferential extent of each of wheels 154 and 155 is exactly one foot, and upon each foot of linear advance of the drill string, one common revolution of shafts 159 and 160 takes place. As the drill string advances one foot, line 23 moves upwardly, and lower shaft 160 thus revolves in a clockwise direction as viewed in FIG. 3.

Extending coaxially with lower shaft 160 is a main drive shaft 166 which has its forward end journaled in a bearing 167 mounted in front housing wall 52, and its rear end journaled in a bearing 168 mounted on the front face of gear 163. Drive shaft 166 may rotate independently of shaft 160 and is adapted to be connected thereto by clutch means mounted between the two shafts.

Secured to the front face of gear 163 is an annular clutch plate 170 which is adapted to engage with a clutch plate 171 fixed for rotation with shaft 166 but slidably mounted thereon. The forward end of plate 171 is formed integrally with a neck portion 172 which is terminated by an enlarged collar 173. A coil spring 174 is positioned in front of collar 173 by a stop 175 and tends to urge the collar and plate 171 rearwardly into an engaged position.

The movements of clutch plate 171 are controlled by the previously mentioned operating handle 33 on the front of the recorder. Handle 33 is connected on the end of an elongated control rod 180 by a short lever arm 181. This rod 180 extends longitudinally through the bottom portion of the recorder and is rotatably journaled in the front and back walls 52 and 53. As handle 33 is moved between the on and off positions, rod 180 is rotated angularly in a clockwise direction as viewed from the front. To hold handle 33 in the selected position it may be spring loaded rearwardly, and carries a rearwardly extending pin 33a which engages in detents 182 or 183 formed in a control plate 184 secured to housing wall 52.

Affixed on rod 180 below clutch plate collar 173 is a cam 186 which, as is seen in FIG. 2b, has a cam rise 187 on the rear face thereof. As rod 180 is rotated, cam rise 187 engages with and moves the end of a crank 188 rearwardly. This crank 188 is centrally pivoted on a shaft 189 and the upper end of the crank rides in the clutch neck 172 bearing against collar 173. Movement of cam 186 thus causes collar 173 to be moved forwardly so as to disengage clutch plate 171 from plate 170. When drilling is actually occurring, control handle 33 is in the on position and the clutch plates 170 and 171 are engaged. Thus main shaft 166 rotates continuously with measuring wheel shaft 160.

In order to count the number of feet drilled a conventional counter mechanism 192 is mounted near recorder window 32 on a bracket 193 extended forwardly from flange 57. Counter 192 is driven from main shaft 166 by a sprocket 194 mounted adjacent collar 173 and engaged with a drive chain 195. Since shaft 166 is only rotated during actual drilling, the counter 192 records only the number of feet of drill penetration and should at all times indicate the depth of the drill.

The record of the rate of penetration is made on chart 70 by a stylus 95a carried at the upper end of a stylus arm 200. Stylus 95a is removably mounted on stylus arm 200 by exactly the same type of holding means as have previously been described for stylus 95, and this description need not be repeated. As is best seen in FIGS. 4 and 6, the upper portion of arm 200 extends vertically and is joined to an angular lower portion which is mounted on a rock shaft 201 that extends horizontally near the front and right hand side of the recorder. As arm 200 swings about the axis of shaft 201 the upper end carrying stylus 95a moves in an angular path, indicated by the arrow in FIG. 6, and causes a mark to be made on chart 70. This angular motion of arm 200 is made to occur once upon each revolution of main shaft 166 by an actuating means as will subsequently be described in detail. The mark which is made on chart 70 is the previously mentioned mark 76 that indicates that the drill has advanced one foot.

Each time that the drill has advanced five feet, arm 200 is moved angularly a slightly greater distance than for the individual foot marks, and the previously mentioned five foot mark 77 is made. Between the times when the angular motion of arm 200 is caused to occur the arm is stationary and stylus 95a traces a longitudinal line on the moving chart 70 which is the base line 75.

Angular movement of arm 200 about the axis of shaft 201 is caused by an actuating member 202 which has the form of a five pointed star wheel seen in detail in FIG. 8. Four of the points of star 202 indicated at 203 are of the same radial length, and the fifth point 204 is somewhat longer. Engagement of any of the points 203 with a striker arm 206 extended from arm 200 causes angular movement of the latter to trace a foot mark 76. Engagement of point 204 with arm 206 causes angular movement to produce the five foot mark 77. It can thus be seen that the desired movement of star wheel 202 is in a path such that one of the points 203 engages striker arm 206 upon each revolution of main shaft 166, and upon the fifth revolution of the shaft the point 204 engages the striker arm.

This desired movement of star wheel 202 is created by planetary gear means mounted on the forward end of shaft 166. Briefly, star wheel 202 is mounted on a planet gear of this system and is moved in a revolving path about the axis of shaft 166. On each revolution it engages once with striker arm 206. At the same time star wheel 202 is rotated about its own axis by the planet gear so that the star points 203 and 204 change positions step-by-step, any one point rotating, in effect, through 360° upon ⅘ of a revolution of shaft 166. Thus upon four effective revolutions of the star wheel 202 the points 203 successively engage arm 206, and upon the fifth revolution the point 204 engages the arm.

As is best seen in FIG. 2, the forward end of shaft 166 has affixed thereon a circular drive member 210. Rotatably mounted on shaft 166 adjacent to drive member 210 is a carrier 211 which is engaged to the drive member through a pin 212 extended from the carrier. As is seen in FIG. 4, drive member 210 has a semi-circular portion of one diameter and a remaining portion of reduced diameter joined to the former by radial shoulders. Pin 212 rides on the edge of the portion of reduced diameter and is adapted to drivingly engage with either of the radial shoulders to cause rotation of carrier 211 in accordance with the movement of shaft 166.

This arrangement constitutes a lost motion connection which allows for limited reverse movement of drive shaft 166 without reversing the movement of carrier 211. It is particularly advantageous under conditions wherein the drill string has a tendency to vibrate or bounce due to hard rock formation or similar problems. By its use false motions of stylus arm 200 through oscillating movement of star 202 is avoided.

Carrier 211 extends diametrically across the axis of shaft 166 and carries on one side a planet gear 216 and on the opposite side a counterweight 217, as is best seen in FIG. 2a. Planet gear 216 is rotatably mounted on a shaft 218 secured to the carrier 211 and is positively connected to star wheel 202 so that the gear and star always rotate and revolve together.

Mounted for engagement with planet gear 216 is a central stationary sun gear 220 which is supported in position by a back plate 221 spaced rearwardly from wall 52 by a plurality of studs 222. The center of sun gear 220 is bored to allow a hub of carrier 211 to extend rotatably therethrough, but the sun gear itself never rotates once it has been properly adjusted. Sun gear 220 is held on plate 221 by screws 223, and as is seen in FIG. 11, these screws pass through circumferentially elongated slots 224 formed in the plate 221 to allow some angular adjustment of the position of the sun gear for proper timing of planet gear 216.

The orbital movement, sometimes referred to herein as the planetation of planet gear 216 about sun gear 220 is in the path shown by the arrow of FIG. 6. Planet gear 216 is, of course, forced to revolve around sun gear 220 by its position on carrier 211, and the relative number of teeth on the two gears are such that upon each revolution of carrier 211, the planet gear is caused to rotate one and one fifth effective; and turns about its own axis. This results in the next successive point of star 202 being brought into position to actuate striker arm 206 on each complete revolution of carrier 211.

As star wheel 202 revolves with gear 216 the points 203 or 204 adjacent to striker arm 206 moves upwardly past the arm, and lifts it and the stylus arm 200 in the desired angular movement. Upon each fifth revolution point 204 will be in the adjacent position to arm 206 and will cause the longer angular movement as has been previously discussed.

On some occasions, the driller may accidentally lift the drill pipe and fail to move operating handle 33 to the off position. This causes drive shaft 166 to move in a reverse direction and star 202 to revolve in a reverse direction as is shown in FIG. 7. In order to avoid angular movement of stylus arm 200 under this condition, striker arm 206 is resiliently mounted thereon so that it may be moved by star 202 without any movement of the stylus arm. To this end, striker arm 206 is mounted on a block 230 which is pivotally secured to arm 200 by a pin 231. Arm 205 may be adjustable lengthwise relative to block 230 by means of an adjusting screw 232.

As is best seen in FIG. 9, block 230 is normally resiliently held upwardly against a stop pin 234 by a spring 235 which is extended between the stop pin and a securing lug 236 on the block. Stop pin 234 is fixedly mounted on arm 200 and thus upon normal upward movement of arm 206, arm 200 is moved with it in angular motion. When striker arm 206 is moved downwardly by star 202, spring 235 yields and allows the star to pass without any movement of arm 200.

It will be remembered from the earlier discussion that it is desirable to move stylus arm 200 relative to chart 70 so as to shift base line 75 whenever the operating handle 33 is moved to the off position. In order that this shift will be clearly readable on chart 70, base line 75 is shifted to the left as seen in FIG. 12 to the base line 78. It is also desirable that the trace line made by stylus 95a in shifting between the base lines 75 and 78 be a straight line preferably extending horizontally as is indicated by the short trace mark 78a shown in FIG. 12. Since it is straight and extends horizontally, the mark 78a may be accurately fixed with relationship to the time scale 71 as might not otherwise be the case. It might also be noted that there is no difficulty in reading marks 76 and 77 against the time scale 71 since the point of intersection of these marks with base line 75 indicates the exact time of occurrence.

To move stylus arm 200 so as to make the mark 78a and trace line 78, an operating lever arm 240 is mounted on control rod 180 and is pivoted therewith by movement of operating handle 33. The upper end of lever arm 240 bears against a pin 241 secured on a follower arm 242 which is mounted on rock shaft 201. Both follower arm 242 and arm 200 are fixed for rotation with shaft 201 and the latter is rotatably journaled as will subsequently be described. Thus arm 200 and arm 242 move as a single member, and are both normally held downwardly by a spring 243 which is tensioned between arm 242 and a lower support post 244.

When lever arm 240 is moved to the right as viewed in FIG. 4 by control rod 180, pin 241 is forced to the right, as is follower arm 242. The exact path of this movement is such as to cause the upper end of arm 200 to move in a straight line to the left so as to record the mark 78a. This is accomplished by a linkage which causes rock shaft 201 to move upwardly while follower arm 242 is guided by a guide block 246.

Rock shaft 201 is rotatably mounted in the lower end of an upwardly extending pivot link 250 which is pivotally mounted at the top on a fixed pivot 251. Thus upon movement of follower pin 241 to the right, rock shaft 201 swings upwardly about the axis of pivot 251. At the same time follower arm 242 is guided by a guide pin 252 riding upon the upwardly angled top surface of guide block 246.

The path of movement of these various members to accomplish this motion is best seen by reference to the diagrammatic view of FIG. 10 wherein each of the component movements is indicated. In order that there may be some shift in the direction in which mark 78a extends, guide block 246 is mounted for angular adjustment by means of a fixed securing bolt 254 and a second securing bolt 255 riding in an elongated slot 256. Guide pin 252 may be threadedly adjustable relative to arm 242 and is held in position by a lock screw 257.

Having thus described the mechanism for shifting the base line of the rate of penetration record it is seen that the complete record has been described. Viewed as an entirety it should be noted that the footage marks vary in their spacing along the time scale. A concentration of closely spaced footage marks indicates slow drilling and informs the driller of a hard formation or a dull bit. At the same time, the weight record swings back and forth and by proper correlation of these two records much valuable information can be gained.

While we have thus described in considerable detail a preferred embodiment of the invention it is to be understood that modifications of design and construction can be made without departing from the spirit of the invention. Therefore, we do not wish to be restricted except as is defined in the appended claims.

We claim:

1. In a penetration recorder for well drilling equipment having a measuring line coupled with said equipment, a pair of gear-coupled measuring wheels adapted to receive said measuring line thereon in a manner providing a total peripheral contact of an extent equivalent to at least 360° of the peripheral extent of one of said wheels without any overlapping side to side contact of said line upon itself; a shaft adapted to be driven by at least one of said wheels; a movable recording element; and a drive connection between said shaft and said recording element, whereby said recording element is moved in accordance with shaft rotation.

2. In a drilling rate recorder: chart means including a removable chart; means to advance said chart means at a uniform rate along the length of said chart; measuring wheel means adapted for engagement with a measuring line connected to the drilling string; a stylus means pivotally mounted for lateral movement across said chart; a planetary gear means connected to said measuring wheel means for rotation therewith, said gear means including a planet gear mounted for simultaneous rotation and planetation by said gear means; and an actuating member connected to said planet gear and adapted to engage said stylus means to move said stylus means upon a planetation thereof, the amount of stylus movement being determined by the rotational position of said actuating member upon its own axis at the time of such engagement.

3. In a drilling rate recorder: chart means including a removable chart; means to advance said chart means at a uniform rate along the length of said chart; measuring wheel means adapted for engagement with a measuring line connected to the drilling string; a stylus means pivotally mounted for lateral movement across said chart; a planetary gear means connected to said measuring wheel means for rotation therewith, said gear means including a planet gear mounted for simultaneous rotation and planetation by said gear means; an actuating member connected to said planet gear for movement therewith, said member having different surfaces thereon adapted to engage and move said stylus means, one of said surfaces engaging said stylus means upon each planetation thereof in accordance with the rotational position of said member upon its own axis at the time of engagement; clutch means adapted to disconnect said planetary gear means from said measuring wheel means; and means operated with said clutch means to move said stylus means in a different direction than that caused by said actuating member.

4. In a drilling rate recorder: chart means including a removable chart; means to advance said chart means at a uniform rate along the length of said chart; measuring wheel means adapted for engagement with a measuring line connected to the drilling string; a stylus means pivotally mounted for lateral movement across said chart; a planetary gear means connected to said measuring wheel means for rotation therewith, said gear means including a planet gear mounted for simultaneous rotation and planetation by said gear means, and a lost motion connection permitting limited reverse movement of said measuring wheel means without reverse movement of said planetary gear means; an actuating member connected to said planet gear for movement therewith said member having different surfaces thereon adapted to engage and move said stylus means, one of said surfaces engaging said stylus means upon each planetation of said planet gear means and in accordance with the rotational position of said member upon its own axis; at the time of such engagement and clutch means adapted to disconnect said planetary gear means from said measuring wheel means.

5. In a drilling rate recorder: chart means including a removable chart; means to advance said chart means at a uniform rate along the length of said chart; measuring wheel means adapted for engagement with a measuring line connected to the drilling string; a stylus means pivotally mounted for lateral movement across said chart; a planetary gear means connected to said measuring wheel means for rotation therewith, said gear means including a planet gear mounted for simultaneous rotation and planetation by said gear means and a lost motion connection permitting limited reverse movement of said measuring wheel means without reverse movement of said planetary gear means; an actuating member connected to said planet gear for movement therewith said member having different surfaces thereon adapted to engage and move said stylus means, one of said surfaces engaging said stylus means upon each planetation of said planet gear means and in accordance with the rotational position of said member upon its own axis; at the time of such engagement clutch means adapted to disconnect said planetary gear means from said measuring wheel means; and means operated by said clutch means to move stylus means linearly across said chart and in a different direction than that caused by said actuating member.

6. In a drilling rate recorder: chart means including a removable chart; means to advance said chart means at a uniform rate along the length of said chart; measuring wheel means adapted for engagement with a measuring line connected to the drilling string; a stylus arm pivotally mounted for lateral movement relative to said chart; a stylus mounted on said arm to trace on said chart; a link arm having one end mounted on a fixed pivot and the other end connected to and movably supporting the pivot of said stylus arm; an actuating member connected to said measuring wheel means and adapted to pivotally move said stylus arm about its pivotal mounting, only, and in a given direction upon each revolution of said measuring wheel means in a direction resulting from downward movement of said drilling string; clutch means adapted to disconnect said actuating member from said measuring wheel means; and means operated with said clutch means to move said link arm about said fixed pivot and cause said stylus arm and said stylus to move therewith in a different direction than that caused by said actuating member.

7. In a drilling rate recorder: chart means including a removable chart; means to advance said chart means at a uniform rate along the length of said chart; measuring wheel means adapted for engagement with a measuring line connected to the drilling string; a stylus arm pivotally mounted for lateral movement relative to said chart; a stylus mounted on said arm to trace on said chart; a link arm having one end mounted on a fixed pivot and the other end connected to and movably supporting the pivot of said stylus arm; an actuating member connected to said measuring wheel means and adapted to pivotally move said stylus arm about its pivotal mounting, only, and in a given direction upon each revolution of said measuring wheel means in a direction resulting from downward movement of said drilling string; clutch means adapted to disconnect said actuating member from said measuring wheel means; and control means operated with said clutch means to move said link arm about said fixed pivot and cause said stylus arm and said stylus to move therewith in a different direction than that caused by said actuating member; said control means including a straight line follower mechanism connected to said last mentioned means and said link means to control the movement of said stylus in a substantially straight line.

8. In a drilling rate recorder: chart means including a removable chart; means to advance said chart means at a uniform rate along the length of said chart; measuring wheel means adapted for engagement with a measuring line connected to the drilling string; a stylus arm pivotally mounted for lateral movement relative to said chart; a stylus mounted on said arm to trace on said chart; a link arm having one end mounted on a fixed pivot and the other end connected to and supporting the pivot of said stylus arm; a planetary gear means connected to said measuring wheel means for rotation therewith, said gear means including a planet gear mounted for simultaneous rotation and planetation by said gear means; an actuating member connected to said planet gear and adapted to pivotally move said stylus arm about the said pivot of said stylus arm only, and in a given direction upon each planetation thereof, said member having different surfaces thereon for successive engagement with said arm depending upon the rotational position of said member upon its own axis at the time of such engagement; clutch means adapted to disconnect said planetary gear means from said measuring wheel and control means; means operated with said clutch means to move said link arm about said fixed pivot and cause said stylus arm and said stylus to move therewith in a different direction than that caused by said actuating member; said control means including an adjustable straight line follower mechanism including a follower and a guide block connected to said last mentioned means and said link means to control the movement of said stylus in a substantially straight line, the direction of said movement being determined by the position of said guide block.

9. In a drilling rate recorder: chart means including a removable chart; means to advance said chart means at a uniform rate along the length of said chart; measuring wheel means adapted for engagement with a measuring line connected to the drilling string; a stylus arm pivotally mounted for lateral movement relative to said chart; a stylus mounted on said arm to trace on said chart; an actuating arm pivotally mounted on said stylus arm and spring urged against a stop surface thereon for movement with said stylus arm in one direction and independent movement in the other direction against said spring; a planetary gear means connected to said measuring wheel means for rotation therewith, said gear means including a planet gear mounted for simultaneous rotation and planetation by said gear means; and an actuating member connected to said planet gear and adapted to engage said actuating arm upon each planetation of said planet gear in the forward direction of movement of said measuring wheel means to move said actuating arm in the direction to move said stylus arm with said actuating arm.

10. In a drilling rate recorder: chart means including a removable chart; means to advance said chart means at a uniform rate along the length of said chart; measuring wheel means adapted for engagement with a measuring line connected to the drilling string; a stylus arm pivotally mounted for lateral movement relative to said chart; a stylus mounted on said arm to trace on said chart; an actuating arm pivotally mounted on said stylus arm and spring urged against a stop surface thereon for movement with said stylus arm in one direction and independent movement in the other direction against said spring; a planetary gear means connected to said measuring wheel means for rotation therewith, said gear means including a planet gear mounted for simultaneous rotation and planetation by said gear means and a lost motion connection permitting limited reverse movement of said measuring wheel means without reverse movement of said planetary gear means; and an actuating star wheel mounted for movement with said planet gear and adapted to engage said actuating arm upon each planetation of said planet gear, said wheel having a plurality of operating point surfaces thereon, and one of said surfaces being of a greater effective length than the remainder of said surfaces whereby upon each effective rotation of said star wheel about its own axis the longer surface engages said actuating arm one time.

11. In a drilling rate recorder: chart means including a removable chart; means to advance said chart means at a uniform rate along the length of said chart; measuring wheel means adapted for engagement with a measuring line connected to the drilling string; a stylus arm pivotally mounted for lateral movement relative to said chart; a stylus mounted on said arm to trace on said chart; a link arm having one end mounted on a fixed pivot and the other end connected to and supporting the pivot of said stylus arm; a planetary gear means connected to said measuring wheel means for rotation therewith, said gear means including a planet gear mounted for simultaneous rotation and planetation by said gear means; an actuating star wheel mounted for movement with said planet gear and adapted to engage said actuating arm upon each planetation of said planet gear, said star wheel having a plurality of operating point surfaces thereon, and one of said surfaces being of a greater length than the remainder of said surfaces whereby upon each effective rotation of said star wheel about its own axis the longer surface engages said actuating arm one time; clutch means adapted to disconnect said planetary gear means from said measuring wheel means; and means operated with said clutch means to move said link arm about said fixed pivot and cause said stylus arm to move therewith in a different direction than that caused by said actuating star wheel.

12. In a drilling rate and weight recorder the combination of: chart means including a removable chart; means to advance said chart means at a uniform rate along the length of said chart; measuring wheel means adapted for engagement with a measuring line connected to the drilling string; a stylus means connected to said measuring wheel means and having a stylus arm pivotally mounted for lateral movement across said chart; a planetary gear means connected to said measuring wheel means for rotation therewith, said gear means including a planet gear mounted for simultaneous rotation and planetation by said gear means; an actuating member connected to said planet gear and adapted to engage said stylus means to move said stylus means upon a planetation of said planet gear, the amount of said movement being determined by the rotational position of said actuating member upon its own rotational axis as determined by the rotational position of said planet gear on its axis at the time of such engagement; and clutch means adapted to disconnect said planetary gear means from said measuring wheel means.

13. In a drilling rate and weight recorder the combination of: chart means including a removable chart; means to advance said chart means at a uniform rate along the length of said chart; measuring wheel means adapted for engagement with a measuring line connected to the drilling string; a stylus means connected to said measuring wheel means and having a stylus arm pivotally mounted for lateral movement across said chart; a link arm having one end mounted on a fixed pivot and the other end connected to and supporting the pivot of said stylus arm; a planetary gear means connected to said measuring wheel means for rotation therewith, said gear means including a planet gear mounted for simultaneous rotation and planetation by said gear means; an actuating member connected to said planet gear and adapted to pivotally move said arm upon each planetation thereof, said member having different surfaces thereon for successive engagement with said arm depending upon the rotational position of said member upon its own axis as determined by the rotational position of said planet gear on its axis at the time of such engagement; clutch means adapted to disconnect said planetary gear means from said measuring wheel means; and control means operated with said clutch means to move said link arm about said fixed pivot and cause said stylus arm and said stylus to move therewith in a different direction than that caused by said actuating member, said control means including a straight line follower mechanism connected to said last mentioned means and said link means to control the movement of said stylus in a substantially straight line.

14. In a drilling rate recorder: chart means including a removable chart; means to advance said chart means at a uniform rate along the length of said chart; measuring wheel means adapted for engagement with a measuring line connected to the drilling string; a stylus means pivotally mounted for lateral movement across said chart; a planetary gear means connected to said measuring wheel means for rotation therewith, said gear means including a planet gear mounted for simultaneous rotation and planetation by said gear means; an actuating member connected to said planet gear for movement therewith, said member having a number of different surfaces thereon adapted successively to engage and move said stylus means, a successive one of said surfaces engaging said stylus means upon each planetation thereof in accordance with the rotational position of said actuating member upon its own axis as determined by the position of said planet gear on its rotational axis at the time of such engagement; one of said surfaces being of greater effective extent than others of said surfaces.

References Cited in the file of this patent

UNITED STATES PATENTS

| | | |
|---|---|---|
| Re. 21,297 | Mizell | Dec. 12, 1939 |
| 946,304 | Zander | Jan. 11, 1910 |
| 1,145,884 | Fish | July 13, 1915 |
| 1,375,761 | Rittenour | Apr. 26, 1921 |
| 2,346,802 | Walker | Apr. 18, 1944 |
| 2,534,569 | Bowditch | Dec. 19, 1950 |
| 2,674,514 | Franz | Apr. 6, 1954 |
| 2,678,867 | Rasmussen | May 18, 1954 |
| 2,679,161 | Yancey | May 25, 1954 |
| 2,756,872 | Hartley | July 31, 1956 |
| 2,829,942 | Bedell | Apr. 8, 1958 |
| 2,831,347 | Yancey | Apr. 22, 1958 |
| 2,860,509 | Phillips | Nov. 18, 1958 |
| 2,883,256 | Nichols | Apr. 21, 1959 |
| 2,974,523 | Bendar | Mar. 14, 1961 |
| 2,980,486 | Melton | Apr. 18, 1961 |

FOREIGN PATENTS

| | | |
|---|---|---|
| 365,736 | Italy | Dec. 12, 1938 |
| 1,022,985 | Germany | Jan. 23, 1958 |

UNITED STATES PATENT OFFICE
CERTIFICATE OF CORRECTION

Patent No. 3,076,966                          February 5, 1963

Oswald Suter et al.

It is hereby certified that error appears in the above numbered patent requiring correction and that the said Letters Patent should read as corrected below.

Column 12, line 2, after "axis" strike out the semicolon; line 3, after "engagement" insert a semicolon; line 24, after "axis" strike out the semicolon; line 25, after "engagement" insert a semicolon; line 71, after "member" strike out the semicolon; column 13, line 67, after "means" insert a comma.

Signed and sealed this 22nd day of October 1963.

SEAL)
ttest:

!NEST W. SWIDER
:testing Officer

EDWIN L. REYNOLDS
Acting Commissioner of Patents